(12) United States Patent
Hegde

(10) Patent No.: US 11,488,727 B2
(45) Date of Patent: Nov. 1, 2022

(54) IMMUTABLE SYSTEM OF RECORDS FOR IOT/CONTROL SYSTEMS FOR COMPLIANCE

(71) Applicant: LogicMatter, Inc., Seattle, WA (US)

(72) Inventor: Kiran V. Hegde, Seattle, WA (US)

(73) Assignee: LOGICMATTER, INC., Seattle, WA (US)

(*) Notice: Subject to any disclaimer, the term of this patent is extended or adjusted under 35 U.S.C. 154(b) by 0 days.

(21) Appl. No.: 16/669,329

(22) Filed: Oct. 30, 2019

(65) Prior Publication Data

US 2020/0135342 A1 Apr. 30, 2020

Related U.S. Application Data

(60) Provisional application No. 62/752,817, filed on Oct. 30, 2018, provisional application No. 62/752,827, filed on Oct. 30, 2018.

(51) Int. Cl.

| | | |
|---|---|---|
| *H04L 12/00* | (2006.01) | |
| *G16Y 40/35* | (2020.01) | |
| *G16Y 40/50* | (2020.01) | |
| *G16Y 40/60* | (2020.01) | |
| *G06F 16/18* | (2019.01) | |
| *G08B 21/18* | (2006.01) | |
| *H04L 67/12* | (2022.01) | |
| *H04L 9/06* | (2006.01) | |

(52) U.S. Cl.
CPC .......... *G16Y 40/35* (2020.01); *G06F 16/1805* (2019.01); *G08B 21/18* (2013.01); *G16Y 40/50* (2020.01); *G16Y 40/60* (2020.01); *H04L 9/0643* (2013.01); *H04L 67/12* (2013.01); *H04L 2209/38* (2013.01)

(58) Field of Classification Search
CPC ........ G16Y 40/50; G16Y 40/60; G16Y 40/35; H04L 67/12; H04L 9/3239; H04L 9/0643; H04L 2209/38; H04L 67/20; G06F 16/1805; H04W 4/70; G08B 21/18
USPC .................................................. 709/216–218
See application file for complete search history.

(56) References Cited

U.S. PATENT DOCUMENTS

| | | | | |
|---|---|---|---|---|
| 8,615,532 | B2 * | 12/2013 | Bessette | G06Q 99/00 707/803 |
| 8,719,576 | B2 * | 5/2014 | Buldas | G06F 21/645 713/175 |
| 9,608,829 | B2 * | 3/2017 | Spanos | H04L 9/3242 |
| 9,635,000 | B1 * | 4/2017 | Muftic | H04L 9/3239 |

(Continued)

*Primary Examiner* — Frantz Coby

(57) ABSTRACT

An immutable system of records for achieving compliance in IoT/Control systems in order to thereby provide the regulator with a centralized immutable system of records, is disclosed herein. A blockchain based immutable record management module configured in association with a plurality of control systems associated with a plurality of devices/systems in a heavily regulated industry environment wherein the blockchain based immutable record management module receives and manages a plurality of immutable records from plurality of control systems associated with a plurality of devices/systems in a heavily regulated industry environment. The blockchain based immutable record management module further securely presents the immutable records to the regulators in order thereby enable the industry to inject undisputed facts to the regulators or the regulation authorities.

15 Claims, 3 Drawing Sheets

(56) References Cited

U.S. PATENT DOCUMENTS

| | | | |
|---|---|---|---|
| 9,985,964 B2* | 5/2018 | Andrade | H04L 63/08 |
| 9,998,286 B1* | 6/2018 | Ramathal | G16H 40/63 |
| 10,304,062 B1* | 5/2019 | Hines | G06Q 30/018 |
| 10,685,323 B2* | 6/2020 | Fuller | G06Q 10/087 |
| 10,711,240 B2* | 7/2020 | Ananta | C12N 1/20 |
| 10,749,865 B2* | 8/2020 | Andrade | G06F 21/30 |
| 10,819,523 B2* | 10/2020 | Irazabal | H04L 9/3239 |
| 10,824,999 B2* | 11/2020 | Chan | G06Q 20/0655 |
| 10,833,845 B2* | 11/2020 | Irazabal | G06F 21/602 |
| 2017/0011460 A1* | 1/2017 | Molinari | G06F 21/645 |
| 2017/0116693 A1* | 4/2017 | Rae | H04L 9/3236 |
| 2017/0140408 A1* | 5/2017 | Wuehler | G06Q 30/0207 |
| 2017/0243193 A1* | 8/2017 | Man | G06Q 20/065 |
| 2018/0241573 A1* | 8/2018 | Ramathal | H04L 9/3236 |
| 2018/0285839 A1* | 10/2018 | Yang | G06Q 20/40 |
| 2019/0163912 A1* | 5/2019 | Kumar | H04L 9/0891 |
| 2019/0305950 A1* | 10/2019 | Treat | H04L 67/2823 |
| 2019/0340685 A1* | 11/2019 | Wade | G06Q 20/12 |
| 2019/0342073 A1* | 11/2019 | Dai | H04L 9/14 |
| 2019/0347658 A1* | 11/2019 | Haimes | G06Q 40/02 |
| 2019/0384839 A1* | 12/2019 | Esposito, II | G06F 16/2365 |
| 2020/0007312 A1* | 1/2020 | Vouk | H04L 9/0637 |
| 2020/0034454 A1* | 1/2020 | Chamarajnager | H04W 4/35 |
| 2020/0074477 A1* | 3/2020 | Lam | G06F 16/27 |
| 2020/0092088 A1* | 3/2020 | Novotny | H04L 63/123 |
| 2020/0219045 A1* | 7/2020 | Kikinis | G06Q 20/203 |
| 2021/0004792 A1* | 1/2021 | Kikinis | G06Q 20/3827 |
| 2021/0014065 A1* | 1/2021 | Gourisetti | H04L 63/12 |
| 2021/0073804 A1* | 3/2021 | Kikinis | G06Q 20/3276 |

* cited by examiner

IMMUTABLE SYSTEM OF RECORDS FOR IOT/CONTROL SYSTEMS FOR COMPLIANCE

TECHNICAL FIELD

Embodiments are generally related to control systems and IoT devices that manage environments such as buildings, Labs, factories, etc., and equipment such as generators, HVAC, medical product manufacturing equipments, autoanalyzers, etc.

Embodiments are improvement over the current process of keeping paper or printed or database records of compliance reportable data to ensure regulators can audit past record keeping, trust the immutability of these recorded data for compliance reporting.

Embodiments are further related to blockchain based systems and networks to record, store, retrieve and report key metrics for the equipments and environments under regulatory periodic compliance audit & reporting process.

Embodiments are particularly related to an improved immutable system of records for achieving compliance in IoT/Control systems in order to thereby provide the regulator with a centralized immutable system of records.

BACKGROUND OF THE INVENTION

IoT Devices and Control Systems are embedded programmable logic systems that help to monitor, control and manage any mechanical/electrical equipment and/or physical environment, which are manufactured by various companies such as Honeywell, SIEMENS, Johnson Controls, Tridium, Delta, Rockwell, NEST, ABB, TRANE, Ingersoll Rand, AMAZON, etc.; and have proprietary UX, data processing and programming tools that are used to create automation to monitor, control all conditions of safety, quality and comfort of physical environments and/or consumer product manufacturing processes.

Regulators in different regions and industries require that certain metrics of safety, comfort and quality are tracked, archived and reported to audit the conditions of the equipments and environments at any given time to ensure compliance standards are met.

For example in Healthcare critical environments have to show how they monitor and control specific isolation room's negative pressure, or show how OT (Operating Theaters) are maintaining specific temperature and humidity conditions. In Labs and pharmaceuticals they record key metrics and show CFR 21 part 11 compliance. In airports for example generators are tested periodically to ensure that auxiliary power systems are verified and tested for compliance.

In particular, heavily regulated and process-oriented industries such as pharmaceuticals and healthcare are subject to periodic local, state, federal and international regulatory reporting of how their critical environments and equipments are being monitored and controlled for safety, comfort and quality metrics.

Additionally, such heavily regulated industries should demonstrate that its critical equipments and environments key compliance metrics are traceable, meaning that a third party can monitor and review/audit historical data for these key metrics for any time period. These onsite inspections, audits, and information requests often focus on a particular equipment and/or environment and/or process. Failure to provide immutable proof of product history traceability will subject the industry to hefty fines as well as shutdowns. It can also negatively effect the reputation of the organization and make it vulnerable to high liability risks and increased insurance premiums.

Majority of the current solutions provide reporting and printing capability to record compliance reports which are referred when regulators are onsite to audit inspections. Minority of these manufacturers rely on operators keeping a log of their changes, generally seen in older equipments and environments.

Many such regulated industries for storage solutions provide the facility to mark documents and files as immutable, i.e., meaning the content of the files and/or the file itself cannot be deleted or modified for a given amount of time or until some other criterion is met. Typically, such requirements come from the compliance-governed agencies and industries, such as government agencies and the health care sector. Such agencies and industries commonly rely on the IT systems to help ensure compliance with regulations which mandate immutable persistence of a given set of files.

In order to ensure trustability of the reports and data logs the IT generally relies on printing these key metrics on paper format and bound paper ledgers that get reviewed by regulators onsite.

The paper being a reasonably immutable format it gives the regular a higher degree of assurance than a database reporting system that the key metrics reproduced in the printed paper recording the value has not been altered by anyone.

Therefore, the conventional IT-based solutions and devices use a wide range of control systems for controlling the factors related to an industry such as, state, processes and or conditions with respect to an equipment/space. Such control systems provide appropriate control and monitoring means for addressing the end user function in an industrial environment. For example, Alerton control systems are programmed to manage a wide variety of sensors and actuators for the air handling unit to manage a space. Each of such systems will appoint independent control systems across the industry environment to control various factors in an industrial environment. It is often difficult for industries to collate the immutable records from different control systems from different systems in the industrial environment. No prior art discusses a complete solution to handle the data from different control systems and provide a centralized immutable record to the regulators or regulation agencies.

Based on the foregoing a need therefore exists for an improved blockchain based immutable record management and retrieval system and method for receiving immutable records from a plurality of control systems in a heavily regulated industrial ecosystem. A need also exists for an improved an immutable system of records for achieving compliance in IoT/Control systems in order to thereby provide the regulator with a centralized immutable system of records, as discussed in greater detail herein.

SUMMARY OF THE INVENTION

The following summary is provided to facilitate a clear understanding of the new features in the disclosed embodiment and it is not intended to be a full, detailed description. A detailed description of all the aspects of the disclosed invention can be understood by reviewing the full specification, the drawing and the claims and the abstract, as a whole.

The key objective of this invention is to show that a blockchain based audit & compliance reporting system can be highly trustworthy, reliable, immutable, consistent and traceable to record and report key metrics required by regulators monitoring critical environments, equipments and processes.

Additionally also provide the ability for regulators to track and monitor key compliance metrics from any remote location and in real time using private blockchain based solution with secure access and enhanced immutable record trustworthiness.

Further objective of the present invention is to provide an improved mechanism and/or system of methods to record, store, query and report auditable data in an immutable system of records for IoT/Control systems in order to improve regulatory transparency and compliance reporting.

The aforementioned aspects along with the objectives and the advantages can be achieved as described herein. An immutable system of records for achieving compliance in IoT/Control systems in order to thereby provide the regulators with a centralized immutable system of records, is disclosed herein.

A blockchain based immutable record management system configured in association with a plurality of Iot devices/Control systems associated with a plurality of environment, equipment and/or process that requires to record, store and report key metrics to any compliance requirement or regulatory certification.

The blockchain based immutable record management module further securely presents the immutable records to the regulators in order thereby enable IT to inject undisputed facts to the regulators and/or compliance authorities.

The blockchain based immutable record management module provides a network of plurality of control systems in a private blockchain network wherein the immutable records are provided only with limited access permission to at least one of the following authorities: regulators, trusted third-party publishers and control systems in the network.

A ledger module for recording and alerting on the critical alerts and records within the network wherein the ledger module alerts appropriate authorities (e.g., facilities manager) and to push the alert into a ledger. A third-party publisher to record the non-disputed contents in the ledger at specific intervals. The blockchain based immutable record management module configured in association with a plurality of control systems associated with a plurality of devices/systems in a heavily regulated industry environment manages and retrieves immutable records from a plurality of control systems from a plurality of locations. Similarly, the ledgers are maintained based on the information received from a plurality of control systems from a plurality of locations.

BRIEF DESCRIPTION OF DRAWINGS

The drawings shown here are for illustration purpose and the actual system will not be limited by the size, shape, and arrangement of components or number of components represented in the drawings.

DETAILED DESCRIPTION

The principles of operation, design configurations and evaluation values in these non-limiting examples can be varied and are merely cited to illustrate at least one embodiment of the invention, without limiting the scope thereof.

The embodiments will be described in detail with corresponding marked references to the drawings, in which the illustrative components of the invention are outlined. The embodiments disclosed herein can be expressed in different forms and should not be considered as limited to the listed embodiments in the disclosed invention. The various embodiments outlined in the subsequent sections are construed such that it provides a complete and a thorough understanding of the disclosed invention, by clearly describing the scope of the invention, for those skilled in the art.

Figure 1:
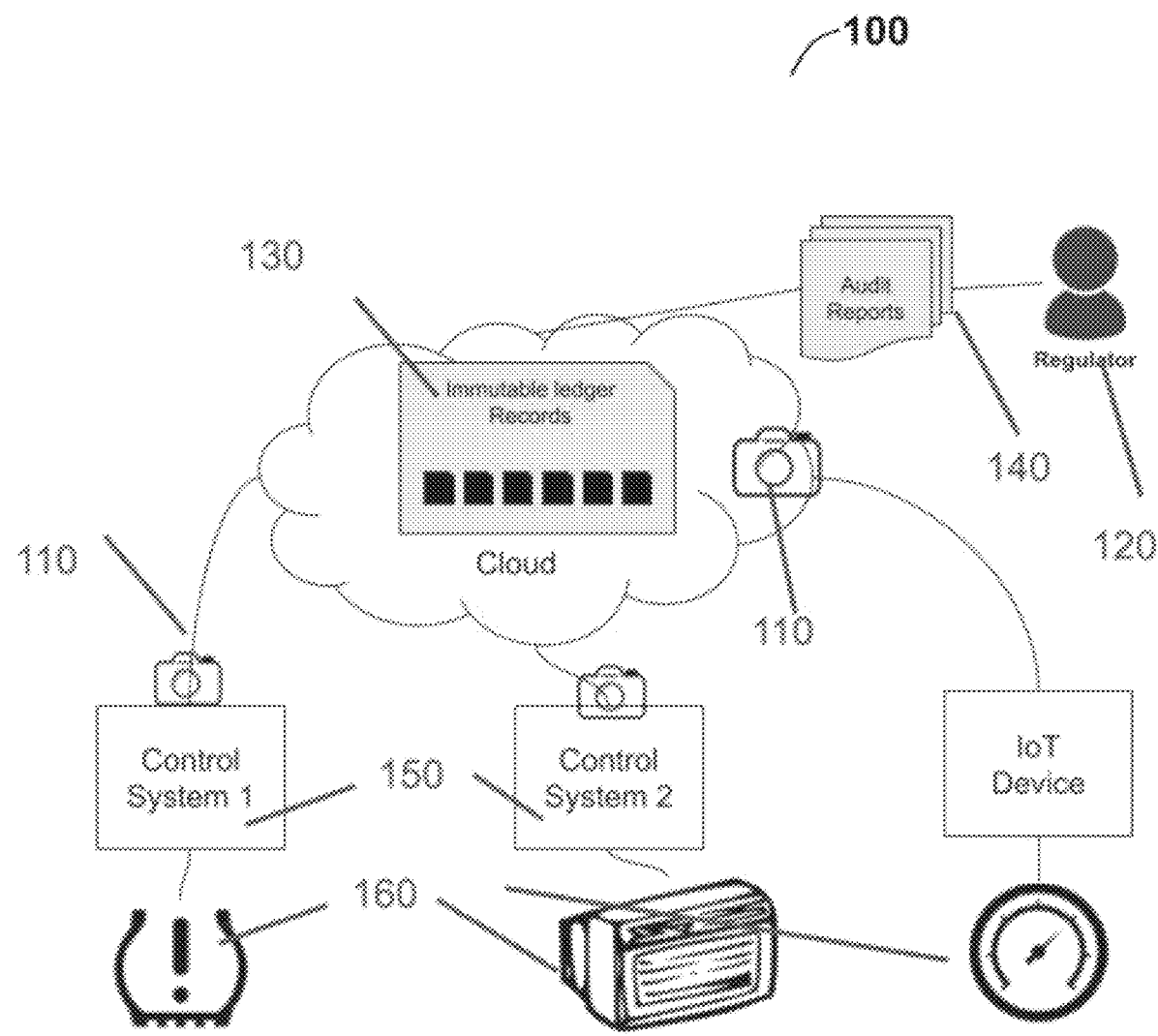
FIG. 1 illustrates a graphical representation of a blockchain based immutable record management system for achieving compliance in IoT/Control systems to provide the regulator with a centralized immutable system of records, in accordance with the disclosed embodiments.

FIG. 1 illustrates in 100 a graphical representation of a blockchain based immutable record management system to record, store and report compliance audit data for IoT devices/Control systems using a immutable recorder component that can run in the cloud or in the control system machines 110 records the key/value pairs of compliance data into specified configurable immutable ledgers 130 in a simple key/value data reportable format 140 to provide the regulators 120 with a centralized immutable system of records 130 and 140 for all connected IoT Devices/Control Systems 150 and all monitored equipments and environments 160, in accordance with the disclosed embodiments. The blockchain based immutable record management module configured in association with a plurality of control systems 150 associated with a plurality of devices/systems/sensors/equipments 160 in any regulated industry environment wherein the blockchain based immutable record management module receives and manages a plurality of immutable records 130 from plurality of control systems 150 associated with a plurality of devices/systems in a heavily regulated industry environment. The blockchain based immutable record management module further securely presents the immutable records 130 to the regulators 120 in order thereby enable the industry to inject undisputed facts to the regulators or the regulation authorities.

Figure 2:
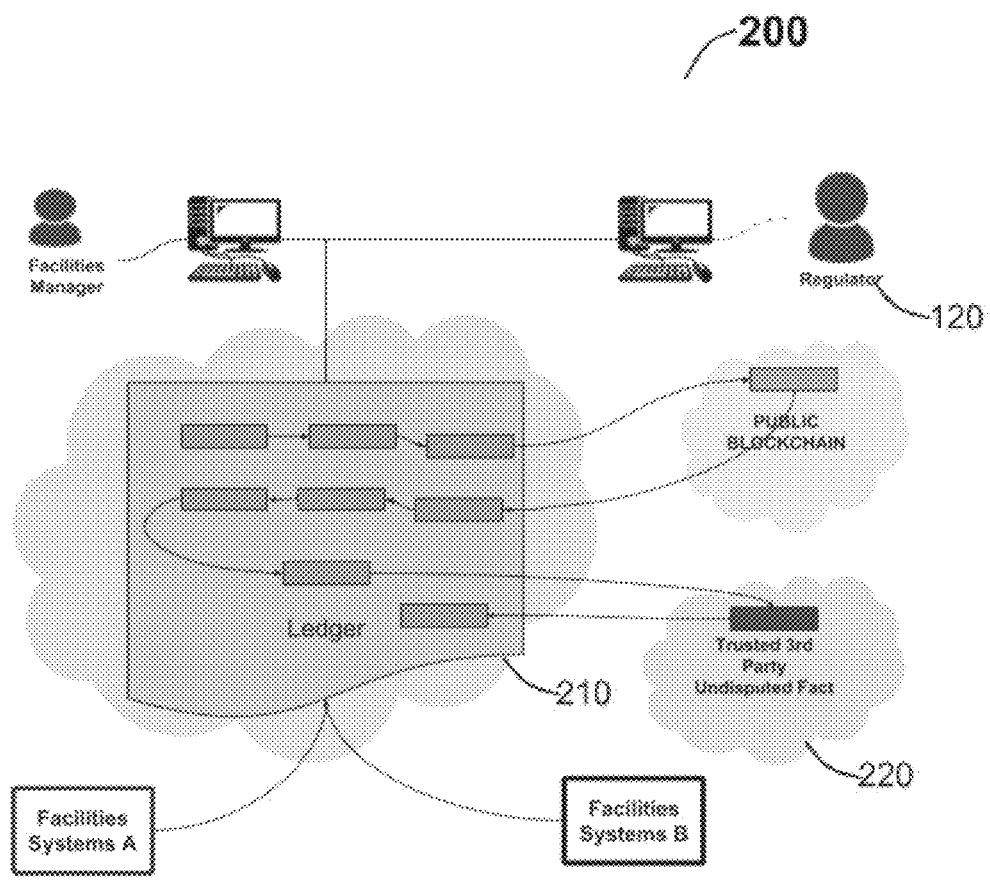
FIG. 2 illustrates another graphical representation of a blockchain based immutable record management system illustrating the immutable records received and maintained from distributed locations and ledgers being shared with a third party, in accordance with the disclosed embodiments.

FIG. 2 illustrates another graphical representation of a blockchain based immutable record management system 200 illustrating the immutable records 130 received and maintained from distributed locations and ledgers 210 being shared with a third party 220, in accordance with the disclosed embodiments. The blockchain based immutable record management module configured in association with a plurality of control systems 110 associated with a plurality of devices/systems in a heavily regulated industry environment provide a third-party network 220 that seamlessly tracks, manages and presents undisputed facts and immutable records to the regulators and authorities. The blockchain based immutable record management module provides a network of plurality of control systems 120 in a private blockchain network wherein the immutable records 130 are provided only with limited access permission to at least one of the following authorities: regulators, trusted third-party publishers and control systems in the network.

The ledger module for recording and alerting on the critical alerts and records within the network wherein the ledger module alerts appropriate authorities (e.g., facilities manager) and to push the alert into the ledger 210. The third-party publisher 220 records the non-disputed contents in the ledger at specific intervals. The blockchain based immutable record management module configured in association with a plurality of control systems 110 associated with a plurality of devices/systems in any regulated industry environment manages and retrieves immutable records from a plurality of control systems from a plurality of locations. Similarly, the ledgers are maintained based on the information received from a plurality of control systems from a plurality of locations.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

Figure 3:
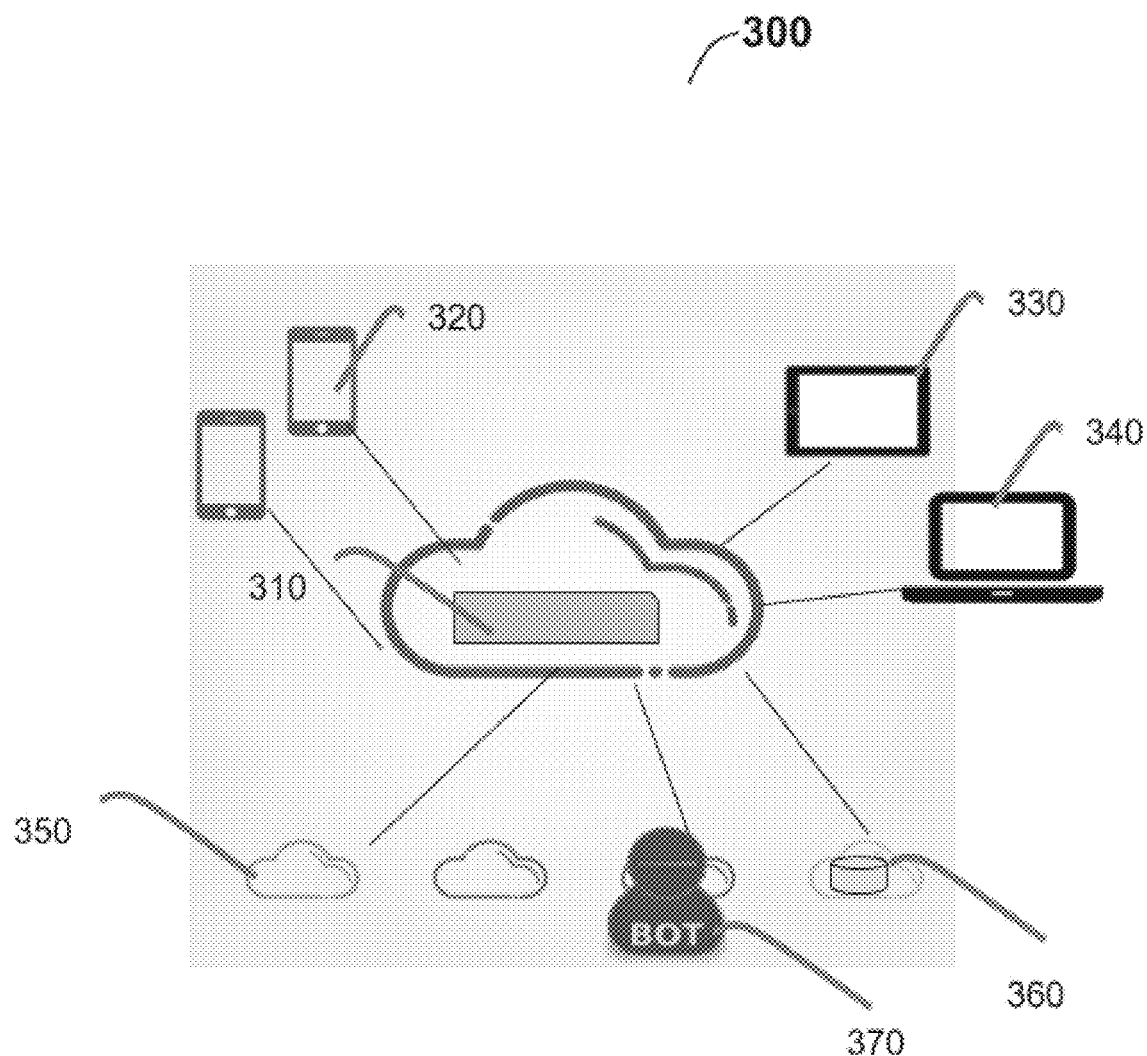
FIG. 3 illustrates another graphical representation of a blockchain based immutable record reporting system illustrating the immutable records in a ledger being accessed and processed in a secure manner from mobile phones, tablets, laptops or PCs, other cloud hosted programs, external databases or datasets, and Bots from distributed locations in accordance with the disclosed embodiments.

FIG. 3 illustrates another graphical representation of a blockchain based immutable record reporting system 300 illustrating the immutable records in ledger 310 being accessed and processed in secure manner from mobile phones 320, tablets 330, laptops or PCs 340, other cloud-hosted programs 350, external databases or datasets 360 and Bots 370 from distributed locations in accordance with the disclosed embodiments. The blockchain based immutable record management module configured in association with a plurality of any external access to process and report the compliance data stored in the ledger 310 associated with a plurality of external devices/systems/programs in a regulated industry environment to access and report undisputed facts and immutable records to the regulators and external authorities or end users.

I claim:

1. Block chain based immutable system of records for IoT and/or control systems compliance data published in block chain ledgers for storing, recording, and reporting, wherein the block chain ledgers are subscribed to by a plurality of regulating systems for tracking key compliance metrics, the block chain based immutable system of records comprising:

a record management module configured in association with a plurality of IoT and/or control systems as publishers of compliance data in the block chain ledgers wherein the block chain ledgers are associated with a plurality of regulatory systems as subscribers to monitor the compliance, and wherein the plurality of IoT and/or control systems are in a heavily regulated environment;

wherein the compliance data is published, recorded, and presented in real-time or near real-time in datasets stored in the blockchain ledgers to track compliance and non-compliance of the plurality of IoT and/or control systems and/or locations of the respective IoT and/or control systems;

wherein the record management module receives and manages a plurality of immutable records from the plurality of IoT and/or control systems, each comprising a processor, memory, network device, and storage media;

wherein the record management module securely enables a trusted third-party publisher to record non-disputed content in the block chain ledgers at specific intervals; and wherein the heavily regulated environment comprises a plurality of IoT and/or control systems publishing key compliance metrics and a plurality of regulators to monitor the plurality of IoT and/or control systems and/or a location for each respective IoT and/or control system being regulated, wherein the plurality of regulators monitor by reviewing and/or auditing raw data stored in the block chain ledgers.

2. The system as claimed in claim 1, wherein the compliance data recorded on the blockchain ledgers present compliance records to the regulators to audit in real-time.

3. The system as claimed in claim 1, wherein the compliance data is recorded in key-value pairs, of metrics specified in ledgers, to provide the regulators with a set of compliance of records, published by the plurality of IoT and/or control systems from multiple locations.

4. The system as claimed in claim 1, further comprising secure access to external devices, programs, and/or systems of the regulators to publish compliance key metric standards that are subscribed by the underlying IoT and/or Control Systems to access compliance standards data to do regulatory reporting and handle non-compliance events and risks in real-time and near real-time.

5. The system as claimed in claim 1, wherein a trusted third-party publisher can record the non-disputed contents in the ledger at specific intervals to provide regulators with specific key compliance key frames.

6. The system as claimed in claim 1, wherein the data recorded for compliance key metrics in the blockchain ledgers are intermittent key-value pairs of time series data from the plurality of IoT and/or control systems from remote devices and/or locations for compliance.

7. The system as claimed in claim 1, wherein the blockchain ledgers contain multiple compliance records maintained based on the information received from the plurality of control systems to comply with plurality of regulatory standards.

8. A blockchain-based system of records for immutable compliance data obtained from one or more IoT devices and/or control systems, the system of records comprising:

a record management module for receiving and managing the immutable compliance data provided from the one or more IoT devices and/or control systems, wherein each of the respective IoT devices and/or control systems comprises a processor, memory, network device, and storage media;

wherein the immutable compliance data is recorded in key/value data pairs in a blockchain ledger that is subscribed to by a regulating system for tracking a compliance metric of the one or more IoT devices and/or control systems; and wherein the immutable compliance data is reportable to the regulating system in real-time or near real-time and presented to the regulating system in the key/value data pairs stored in the blockchain ledger.

9. The blockchain-based system of records of claim 8, wherein the record management module securely enables a third-party to record non-disputed content in the blockchain ledger at specific intervals.

10. The blockchain-based system of records of claim 8, wherein the record management module is configured for a plurality of regulatory systems.

11. The blockchain-based system of records of claim 8, wherein the immutable compliance data is recorded in key/value data pairs in a plurality of blockchain ledgers that are subscribed to by the regulating system.

12. The blockchain-based system of records of claim 8, wherein the immutable compliance data is recorded in key/value data pairs in a plurality of blockchain ledgers that are subscribed to by a plurality of regulating systems.

13. The blockchain-based system of records of claim 8, wherein the immutable compliance data is provided by a plurality of IoT devices and/or control systems.

14. The blockchain-based system of records of claim 13, wherein the plurality of IoT devices and/or control systems are in a plurality of locations.

15. The blockchain-based system of records of claim 8, wherein the regulating system is in a regulated industry environment.

* * * * *